(12) United States Patent
Anthony

(10) Patent No.: US 6,279,568 B1
(45) Date of Patent: Aug. 28, 2001

(54) COOKING APPARATUS AND METHOD

(76) Inventor: Michael M. Anthony, 10189 W. Sample Rd., Parkland, FL (US) 33065

( * ) Notice: Subject to any disclaimer, the term of this patent is extended or adjusted under 35 U.S.C. 154(b) by 0 days.

(21) Appl. No.: 09/411,713

(22) Filed: Oct. 4, 1999

(51) Int. Cl.[7] .................................................. A47J 27/00
(52) U.S. Cl. ................................. 126/381.1; 126/382.1; 126/384.1; 62/3.62; 99/347
(58) Field of Search .................... 126/381, 382, 126/383, 384, 385, 386, 380, 381.1, 382.1, 383.1, 384.1, 385.1, 386.1; 99/293, 294, 347; 62/3.2, 3.4, 3.6, 3.62, 3.7

(56) References Cited

U.S. PATENT DOCUMENTS

| 1,417,243 | * | 5/1922 | Graves | 99/293 |
| 1,477,667 | * | 12/1923 | Schluesselburg | 126/381.1 |
| 2,517,167 | * | 8/1950 | Bemis | 126/380 |
| 2,527,395 | * | 10/1950 | Burditt | 99/347 |
| 2,636,636 | * | 4/1953 | Smith | 126/384.1 |
| 3,085,498 | * | 4/1963 | Falla | 126/382.1 |
| 3,209,746 | * | 10/1965 | Guiseppe | 126/381.1 |
| 3,212,274 | * | 10/1965 | Edius | 62/3.4 |
| 3,780,642 | * | 12/1973 | Bay | 99/347 |
| 3,937,210 | * | 2/1976 | Kachaylo | 126/381.1 |
| 4,539,899 | * | 9/1985 | Schmitt | 126/381.1 |
| 4,728,778 | * | 3/1988 | Choi et al. | 126/381.1 |
| 5,255,735 | * | 10/1993 | Raghava et al. | 62/3.4 |
| 5,481,967 | * | 1/1996 | Chen | 126/381.1 |

* cited by examiner

Primary Examiner—Ira S. Lazarus
Assistant Examiner—Josiah C. Cocks
(74) Attorney, Agent, or Firm—Oltman, Flynn & Kubler

(57) ABSTRACT

Cooking apparatus and method in which cooking vapors containing oils and food particulates from food cooking in a pot is condensed on a heat exchanger at the bottom of a lid covering the pot, thereby minimizing the escape of food particulates and oils into the surroundings.

2 Claims, 12 Drawing Sheets

COOKING APPARATUS AND METHOD

This application is based on Disclosure Document ID #461,754 filed Sep. 8, 1999 in the United States Patent and Trademark Office, Disclosure Document Program.

BACKGROUND OF THE INVENTION

This invention relates to a cooking apparatus and method which greatly reduces the escape of cooking vapors from food being cooked in a pot, thereby reducing the residual smells and other deleterious effects of the oils and food particulates in such cooking vapors.

Conventional cooking methods generally require that water based products with oils and other food ingredients be boiled for proper cooking. The boiled-off water, oil residues, and solid food particulates often produce undesirable smells, not only in the kitchen but elsewhere in the vicinity of the cooking. The problem is particularly annoying in the home, but even more so in closely confined quarters, such as on submarines, Navy ships, and sailboats. The residues of cooking, though fine and hardly visible, can build up over time and cause staining as well as lingering odors on furniture, draperies, carpets, and clothing. In addition, the cooking residues promote mildew and bacterial growth, and make it difficult and sometimes unhealthy for many people to breathe in such a polluted environment.

BRIEF SUMMARY OF THE INVENTION

The present invention is directed to a cooking apparatus and method which reduces the escape of cooking vapors from the pot in which food is being cooked by efficiently condensing those vapors on the underside of a lid covering the pot, thereby substantially preventing the escape of oil residues and food particulates to the surroundings.

Further objects and advantages of this invention will be apparent from the following detailed description of presently-preferred embodiments thereof, shown in the accompanying drawings.

DETAILED DESCRIPTION OF THE PRESENT INVENTION

Before explaining the disclosed embodiments of the present invention in detail it is to be understood that the invention is not limited in its application to the particular arrangements shown and described since the invention is capable of other embodiments. Also, the terminology used herein is for the purpose of description and not of limitation.

Figure 1:
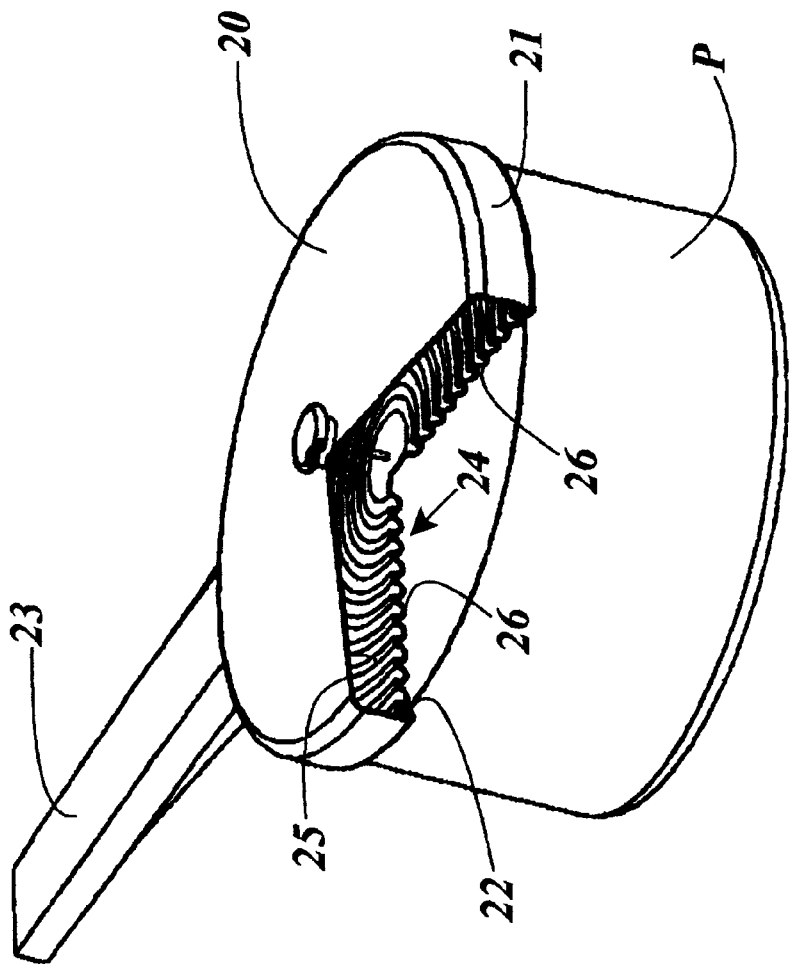
FIG. 1 is a perspective view showing a cooking pot covered by a lid constructed with an integral heat exchanger, in accordance with a first embodiment of the present invention, the heat exchange lid being shown broken away to reveal structural details.
Figure 2:
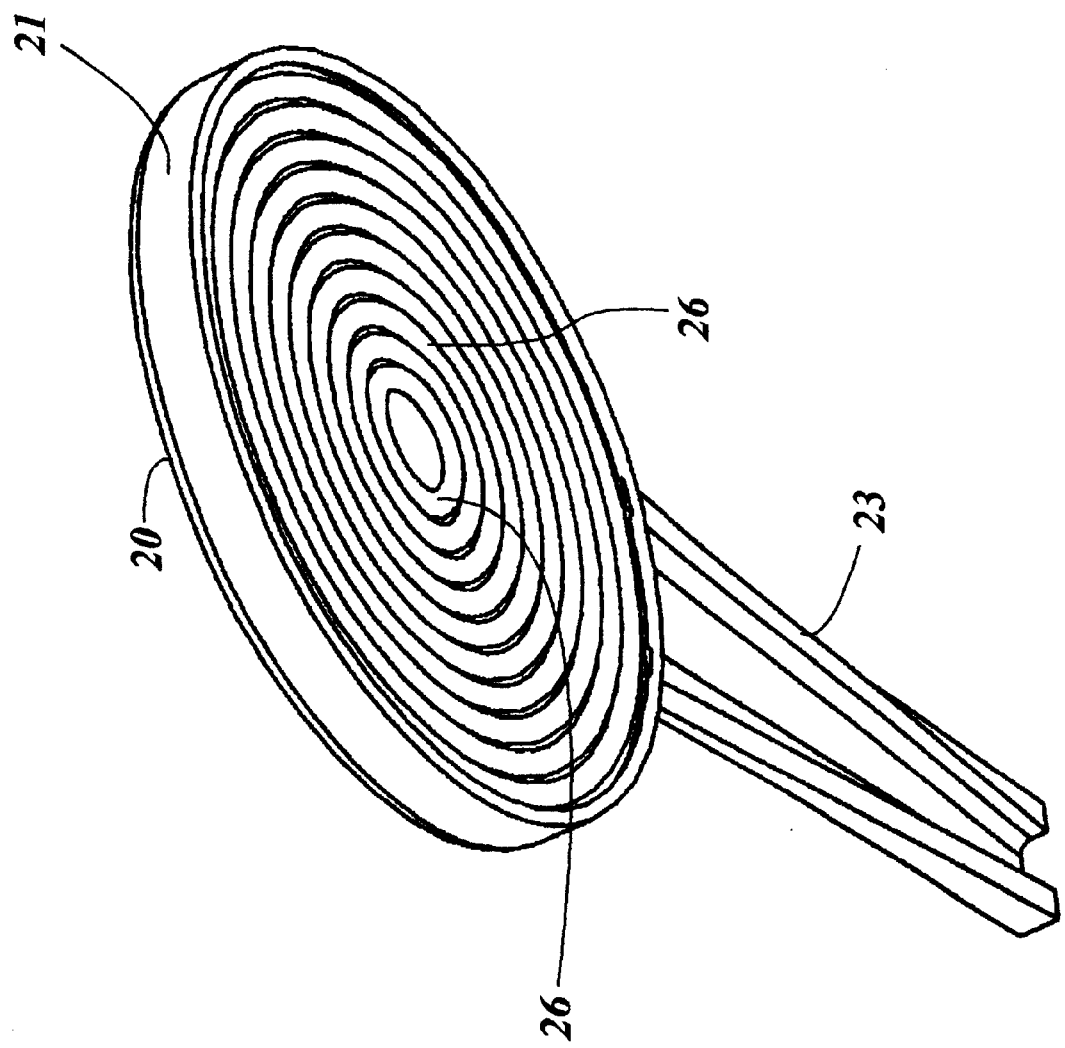
FIG. 2 is a perspective view of the heat exchange lid of FIG. 1 in an inverted position.

In the embodiment shown in FIGS. 1 and 2 the cooking pot lid of the present invention has a circular, generally flat top wall 20 and a depending cylindrical side wall 21 extending down from the periphery of the top wall. The peripheral side wall terminates at its lower edge in an upturned, rounded lip 22 that closely engages the cooking pot P around the top. A handle 23 is joined to the side wall 21 in any suitable fashion In accordance with this embodiment of the present invention, the lid is provided with an integral heat exchanger. For this purpose it has a bottom wall 24 spaced below its top wall 20 so as to provide a hollow interior or recess 25 inside the lid. Preferably, as shown in FIG. 1, the bottom wall 24 has an uneven configuration to increase the bottom surface area that is exposed to cooking vapors rising from the food being cooked in pot P. In the particular embodiment shown, this unevenness or unflatness is achieved by forming the bottom wall 24 with concentric, circular, hollow ribs 26 with a semi-circular cross-sectional profile. However, it is to be understood that these hollow ribs can have any other desired cross-sectional profile, such as triangular, and that fins may project down from these ribs to further increase the exposed area at the bottom of the lid.

Also in accordance with the present invention, the hollow interior 25 of the lid holds a suitable heat absorbing substance, such as water in liquid form or wax in solidified or frozen form. The heat absorbing substance should be non-toxic and should have a heat of vaporization high enough to enable it to efficiently and rapidly absorb the heat conducted to it by the bottom wall 24 of the lid. Preferably, the rate of heat absorption by the heat exchanger in the lid is at least as great as the rate of boiling of the cooking broth in the pot P. When water is the heat absorbing substance in the lid, preferably it should weigh at least 5% of the weight of the cooking broth in pot P to insure the rapid condensation of the cooking vapors on the bottom surface of bottom wall 24.

The material of the bottom wall 24 of the lid has high heat conductivity for efficient heat transfer from the cooking vapors to the heat absorbing substance (e.g., water or wax) in the hollow interior 25 of the lid. Aluminum and copper are suitable. The bottom wall 24 can be relatively thin to promote rapid heat transfer because the presence of the heat absorbing substance above it tends to offset the pressure exerted on it from below by the cooking vapors rising from the pot P.

If desired, the lid may be provided with a relief valve (not shown) of known design to automatically relieve the pressure that may build up in its hollow interior 25 as the heat absorbing substance heats up during cooking.

Also, the lid may be provided with a manually operated valve 17 for filling and emptying its hollow interior 25, when desired. See FIG. 7, which shows the preferred valve 17 in which the weight of the pointed shaft of valve gate 18 holds valve gate 18 in the valve port 19 until either a user lifts valve gate 18 out of valve port 19 or until sufficient pressure builds up in hollow interior 25 to dislodge valve gate 18 to release excess pressure safely. For example, if water is the heat absorbing substance, after a cooking operation the manual valve 17 may be opened to empty the heated water from the lid, after which a new batch of cooler water may be introduced.

Figure 3:
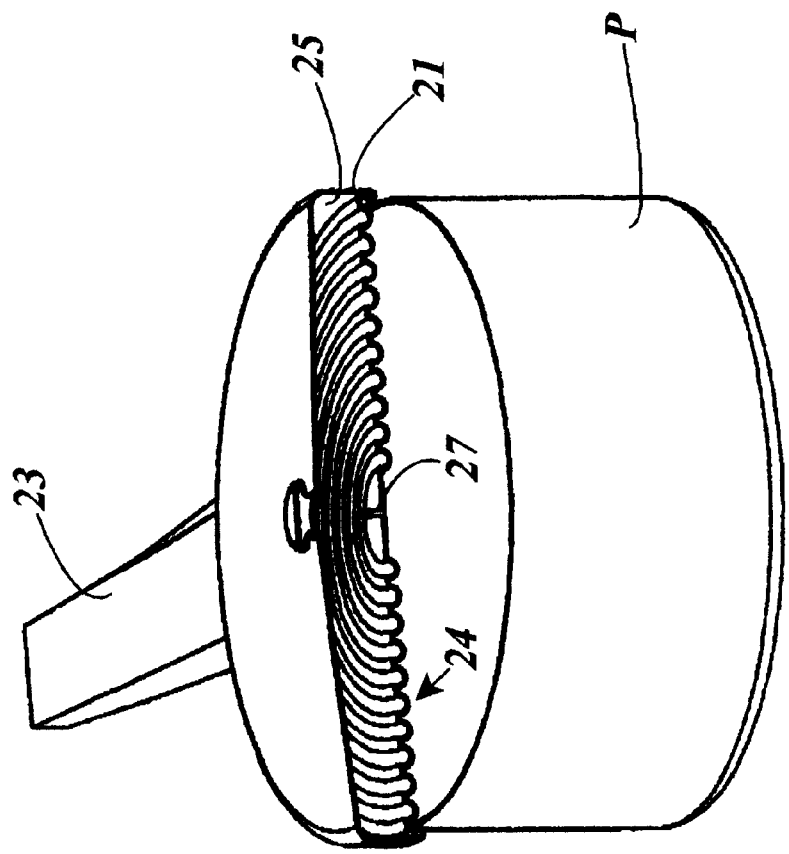
FIG. 3 is a view similar to FIG. 1 of a second embodiment of this invention.
Figure 4:
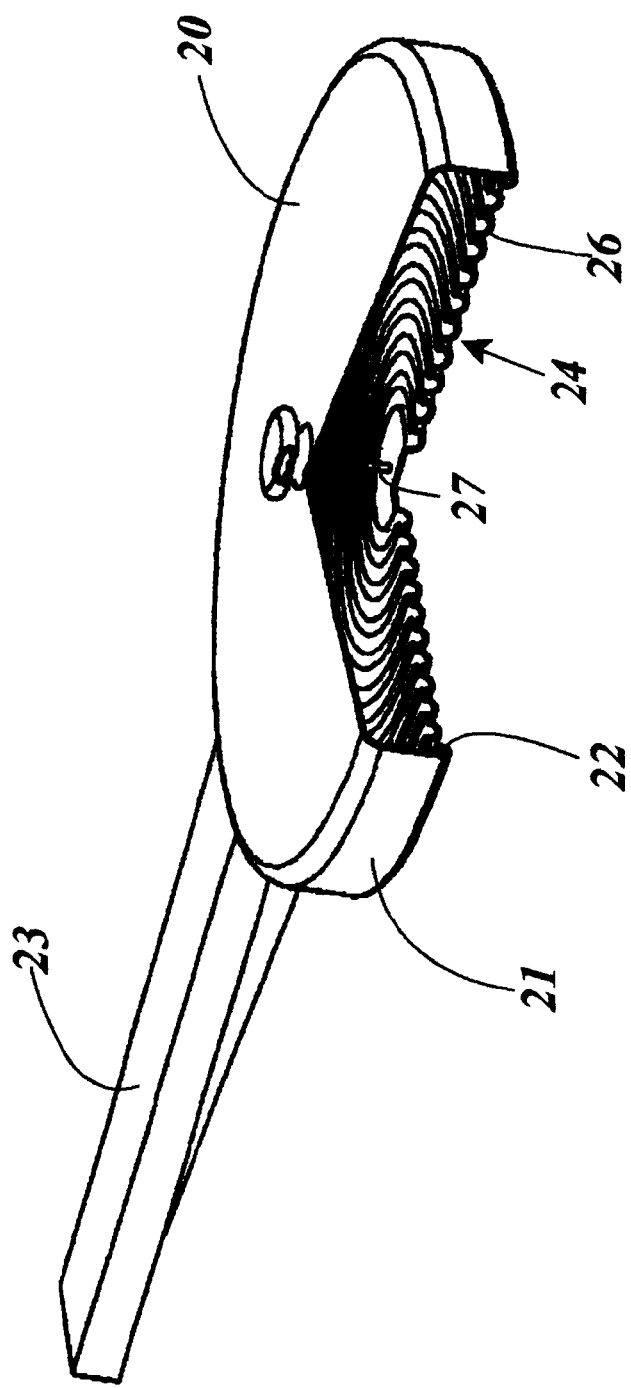
FIG. 4 is a perspective view of the heat exchange lid of FIG. 3, broken away to show structural details.

FIGS. 3 and 4 illustrate a second embodiment of the invention which in most respects is essentially similar to the first embodiment. Elements in the second embodiment which correspond to those in the first are given the same reference numerals and need not be described in detail again.

The embodiment of FIGS. 3 and 4 differs from the embodiment of FIGS. 1 and 2 by the provision of a small tube 27, open at both ends, that extends up from the bottom wall 24 of the heat exchange lid at a central location thereon to provide fluid communication between the space below this wall and the hollow interior 25 of the lid above it. Tube 27 passes cooking vapors from the pot P directly into the cooling medium (e.g., water) located in the hollow interior 25 of the lid. These cooking vapors are condensed directly by the cooling medium with a high degree of heat transfer efficiency. From time to time the hollow interior 25 of the lid may be emptied by opening a valve on the lid, as described, and refilling with water.

It is to be understood that more than one such tube 27 may be provided, if desired.

Figure 5:
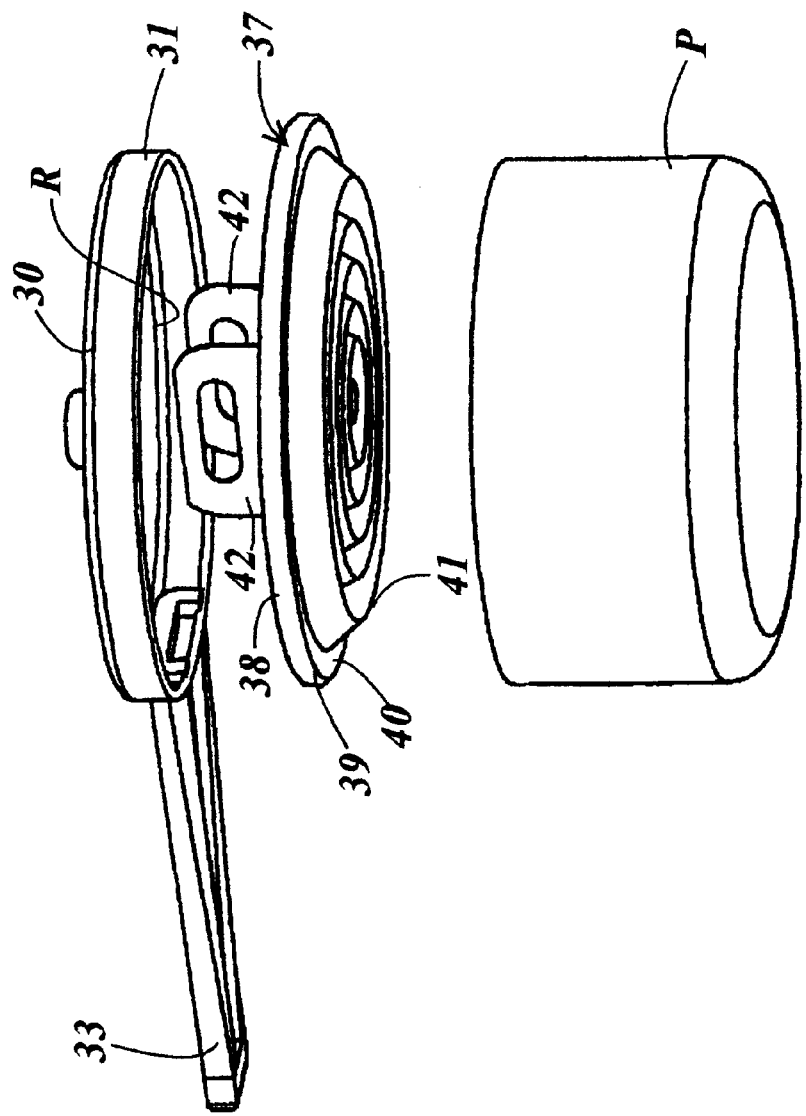
FIG. 5 is an exploded perspective showing a cooking pot, a lid for the pot, and a separable heat exchange unit that fits under the lid, in accordance with a third embodiment of this invention.
Figure 6:
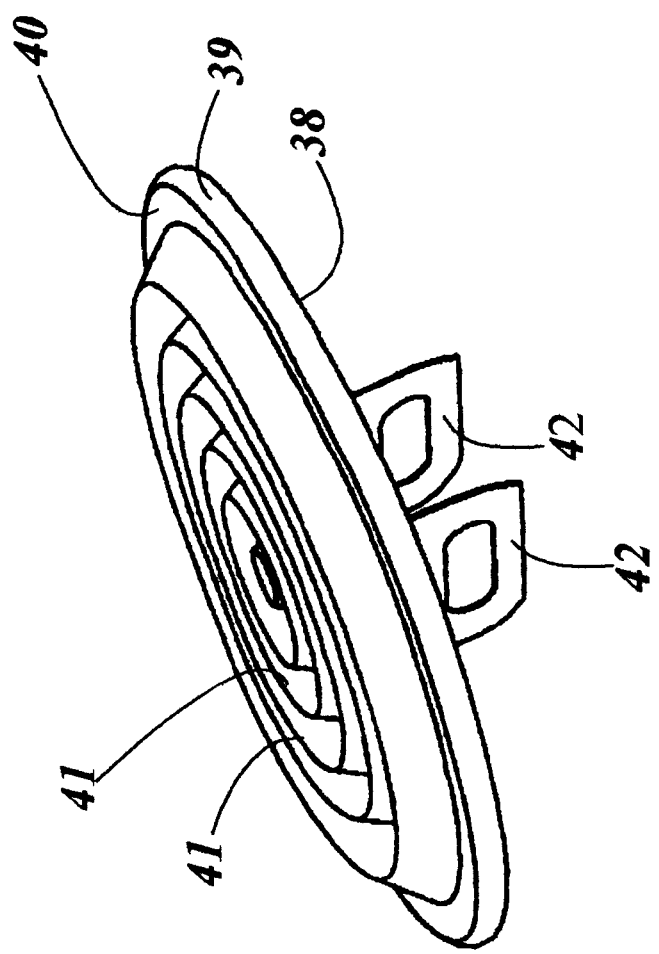
FIG. 6 is a perspective of the heat exchange unit of FIG. 5 in an inverted position.

FIGS. 5 and 6 illustrate a third embodiment of the invention which differs from the first by providing a heat exchanger that is not integral with the lid but is formed as a self-contained, physically separable unit that may be readily assembled to the lid or the pot and removed from it after use. This physically separable heat exchange unit may be designed for use once only, after which it would be discarded, or it may be designed for repeated use.

Referring to FIG. 5, the lid proper has a generally flat, circular top wall 30, a depending cylindrical side wall 31, and a handle 33, much the same as in the first embodiment of the invention. The lid proper is open below its top wall 30, presenting an open-bottomed recess R bounded by its peripheral side wall 31.

The physically separable heat exchanger is indicated generally by the reference numeral 37. It has a flat, circular, top wall 38 and a depending, cylindrical, side wall 39 which extends down from the periphery of top wall 38 and has a snug fit inside the bottom recess R in the lid proper. It could also fit on the top rim of the pot. On the bottom, the heat exchanger has a lower wall 40 extending in from the bottom edge of its peripheral side wall 39 parallel to its top wall 38, and a concentric series of circular hollow ribs 41 of triangular cross-section projecting down from the lower wall 40. The heat exchanger is a sealed unit having a hollow interior or recess bounded by its top wall 38, peripheral side wall 39, lower wall 40 and hollow ribs 41, and containing a suitable heat absorbing substance, as described.

A pair of fold-down handles 42 extend up from the top wall 38 to facilitate handling the heat exchange unit. These handles may be pivotally connected to top wall 38 or they may be thin enough to fold down readily against the top wall 38 when the heat exchange unit is inserted into the bottom recess R in the lid proper.

The assembled lid and heat exchanger have a snug fit on top of the cooking pot P.

This embodiment of the invention has the advantage that the separable heat exchange unit can be stored in a refrigerator or freezer before use, thereby enhancing its effectiveness at the start of its use on the cooking pot P.

Figure 7:
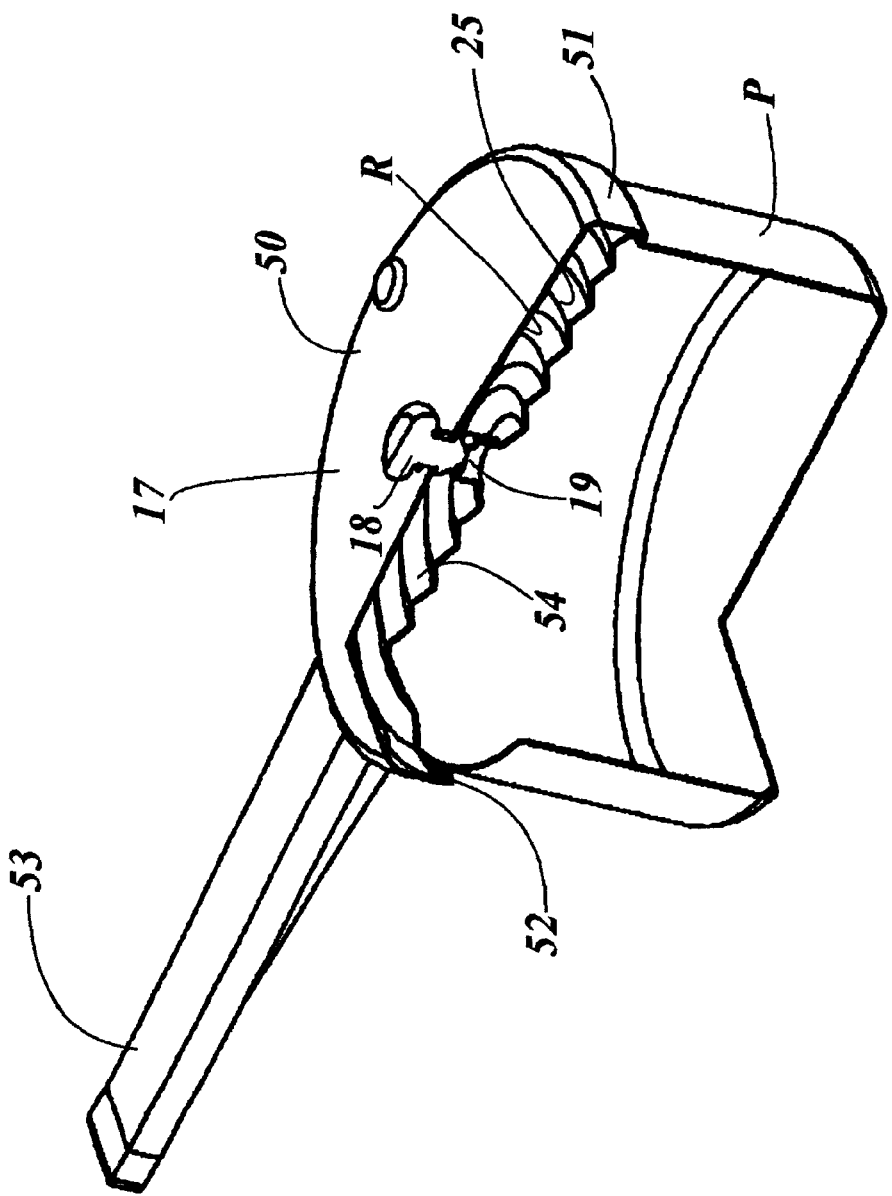
FIG. 7 is a perspective view, with parts broken away for clarity, showing a lid and heat exchanger assembly in accordance with a fourth embodiment of the present invention, positioned on a cooking pot.

FIG. 7 shows a fourth embodiment of the invention which is similar to the third embodiment (FIGS. 5 and 6) in that the heat exchanger is a separable unit that is attachable to and removable from the lid proper, but differs from the third embodiment in that it relies completely on the heat absorbing effectiveness of its uneven bottom surface that is exposed to the cooking vapors since it does not have an additional heat absorbing substance.

Referring to FIG. 7, the lid proper has a generally flat, circular top wall 50, a depending cylindrical side wall 51 at the periphery of the top wall, and a handle 53. The peripheral side wall 51 terminates at its bottom edge in an inwardly and upwardly turned. rounded lip 52 that defines with it an open-topped annular groove or channel at the inside of the side wall. The lid proper presents an open-bottomed recess R' below its top wall 50.

In accordance with this embodiment of the invention, a separately formed heat exchange unit in the form of a generally circular plate 54 is removably attached to the lid proper by means of a snap fit of its periphery in the annular groove that extends around the lower edge of the lid proper between the upturned lip 52 and the side wall 51. The heat exchange plate 54 has an unflat, uneven configuration that increases the surface area on the bottom which is exposed to cooking vapors coming up from pot P. For example, this uneven configuration can be achieved by forming the plate with a series of concentric, circular, hollow ribs having a triangular cross-section or a semi-circular profile in cross-section.

Because of its detachability from the lid proper, the heat transfer plate 54 can be conveniently stored before use in a refrigerator or freezer to enhance its heat absorption effectiveness early in the cooking process.

Figure 8:
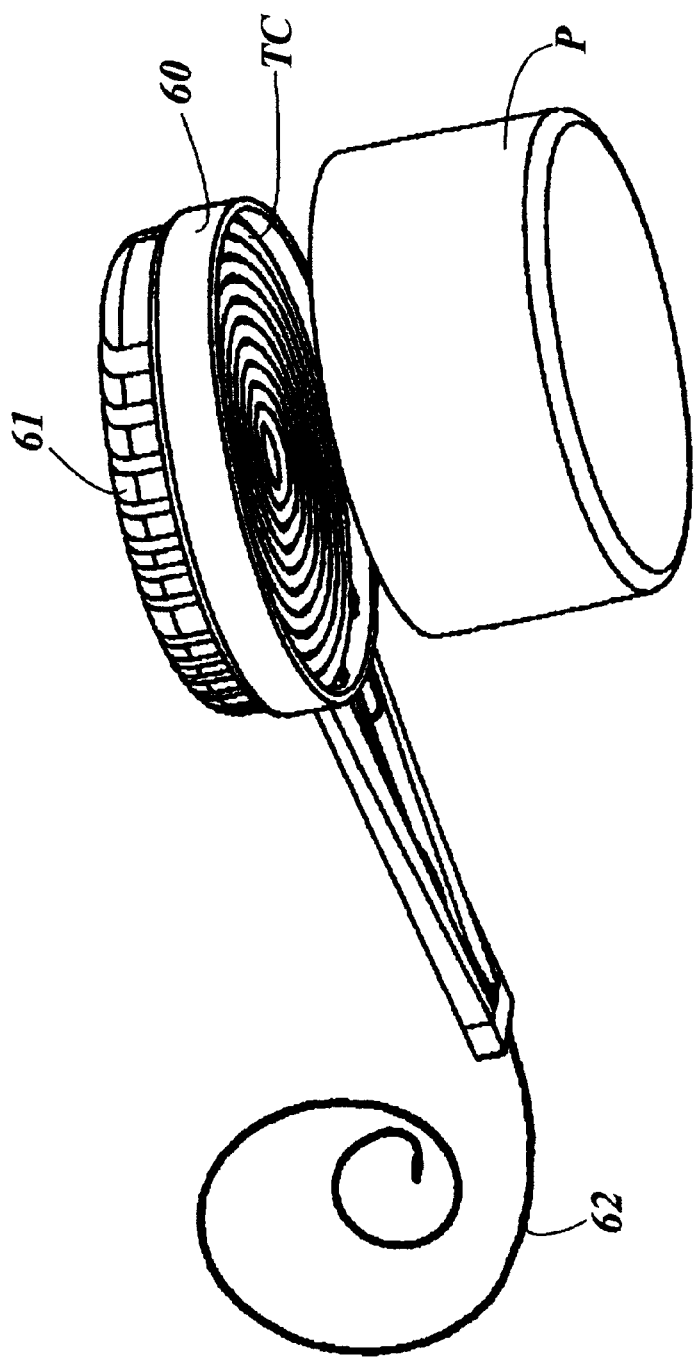
FIG. 8 is an exploded perspective view of a fifth embodiment of the present invention, having a thermoelectric cooler for condensing cooking vapors.

FIG. 8 shows a fifth embodiment of the present invention which has a thermoelectric cooler as the heat transfer device in the lid.

As is well known, a thermoelectric cooler has two dissimilar materials joined to each other and electrically energized to operate on the well-known Peltier effect, acting as a small refrigerator. This embodiment of the present invention uses such a thermoelectric cooler to condense the cooking vapors rising from the cooking pot. Referring to FIG. 8, the thermoelectric cooler TC is fitted in the cooking lid with its cool side down and its hot upper side in heat conducting relationship to heat radiating fins 61 on the top of the lid. If the thermoelectric cooler TC is permanently joined to the lid proper, it may be joined physically to the fins 61. Alternatively, if the thermoelectric cooler TC is physically separable from the lid proper, it may directly contact the fins 61 although not physically joined to them.

An electrical power cord 62 contains conductors connected respectively to the hot and cool sides of the thermoelectric cooler TC to pass current between them when connected to a suitable voltage source. The voltage can be adjusted by a suitable regulator (not shown) connected in the power cord. The applied voltage determines the cooling effect of the thermoelectric cooler. The higher the voltage, the colder will be the underside of the cooler and the greater its cooling effect.

Cooking vapors rising from the pot P are condensed on the cool underside of thermoelectric cooler TC, and the heat absorbed by the thermoelectric cooler is dissipated to the surroundings by the fins 61 on top of the lid.

Figure 9:
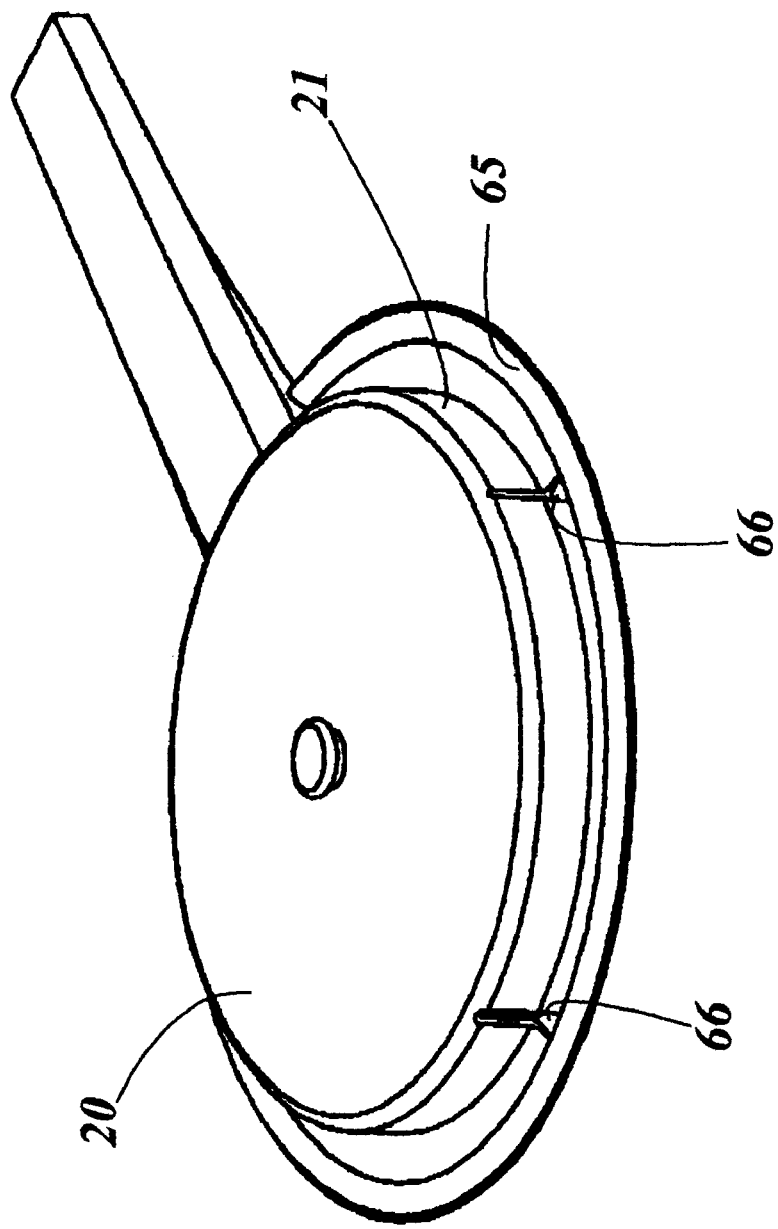
FIG. 9 is a perspective view of a heat exchange lid in accordance with a sixth embodiment of this invention.

FIG. 9 shows a sixth embodiment of the invention which has s special arrangement for collecting some of the cooking vapor condensate from the underside of the heat transfer lid. As shown, a hollow toroidal condensate collector 65 extends around the pan lid 20 which may have a heat absorbing arrangement as shown and described with reference to FIG. 1. The peripheral side wall 21 of the pan lid is formed with openings or slots located just below its bottom wall so as to receive some of the condensate therefrom. These openings or slots communicate with the interior of the condensate collector ring 65 through channels or tubes 66 extending radially between the peripheral side wall 21 of the lid and the condensate collector 65.

With this arrangement, some of the cooking vapor condensate on the bottom wall of the lid 20 flows out into the condensate collector 65. A suitable valve (not shown) is provided on the condensate collector to enable the condensate products collected in it to either be discarded or returned to the cooking pot.

Figure 10:
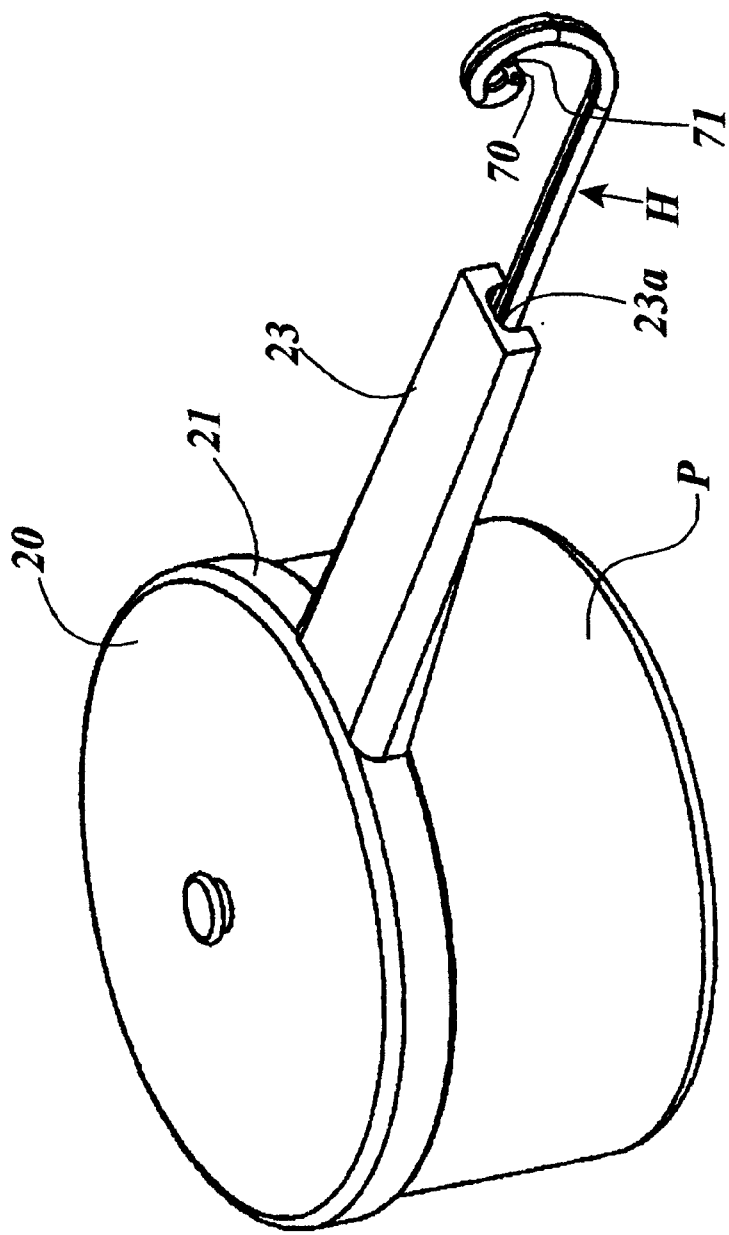
FIG. 10 is a perspective view of a cooking pot and lid assembly provided with a cold water hose fitting in accordance with a seventh embodiment of this invention.
Figure 11:
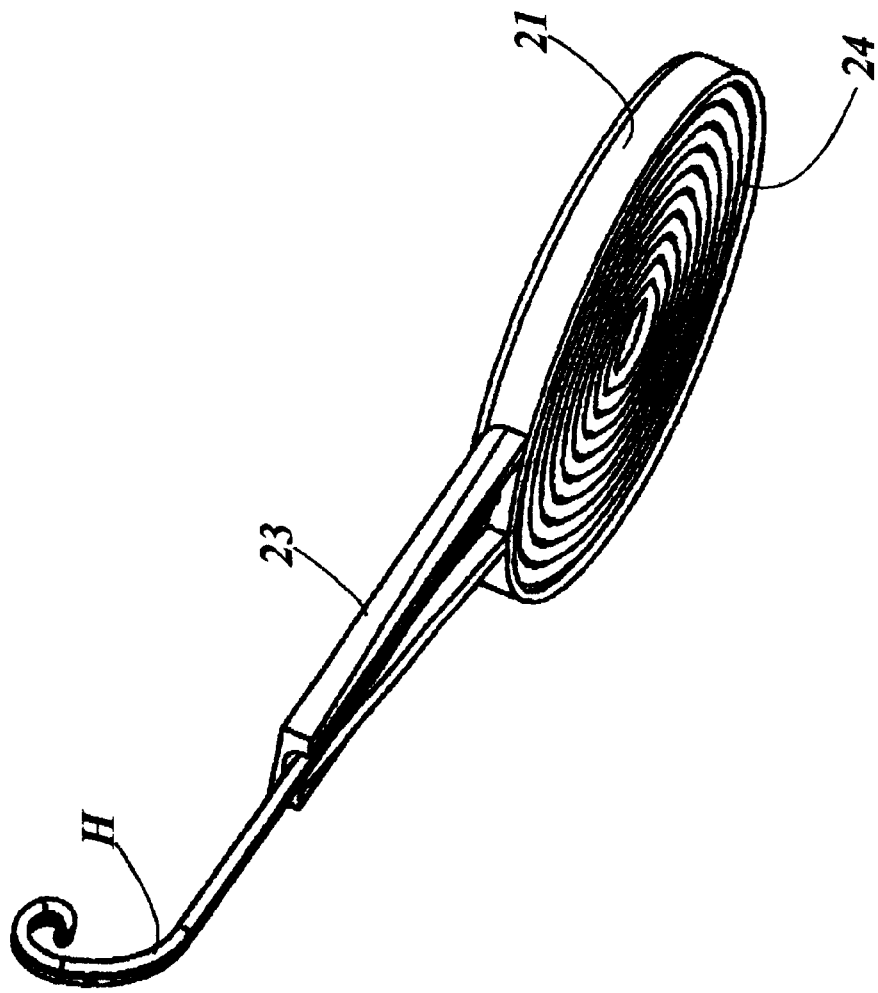
FIG. 11 is a perspective view of the lid and the hose fitting of FIG. 10 in an inverted position.

FIGS. 10 and 11 show a seventh embodiment of the invention in which cold water can be circulated continuously through the heat exchange lid. In this embodiment the heat exchange lid may be constructed as shown in FIG. 1, with a hollow interior for holding the cooling medium, which in this case is cold water from a kitchen faucet.

A dual hose fitting H extends through a longitudinal channel 23a formed on the bottom of the lid handle 23. This hose fitting provides two water passageways 70 and 71, one for passing cold water from a kitchen faucet to the hollow interior of the lid. and the other for returning the water from the hollow interior of the lid to the kitchen sink.

With this arrangement, cold water is circulated continuously through the lid, keeping its bottom wall 24 cool and thereby enhancing its effectiveness in condensing cooking vapors rising from pan P.

Figure 12:
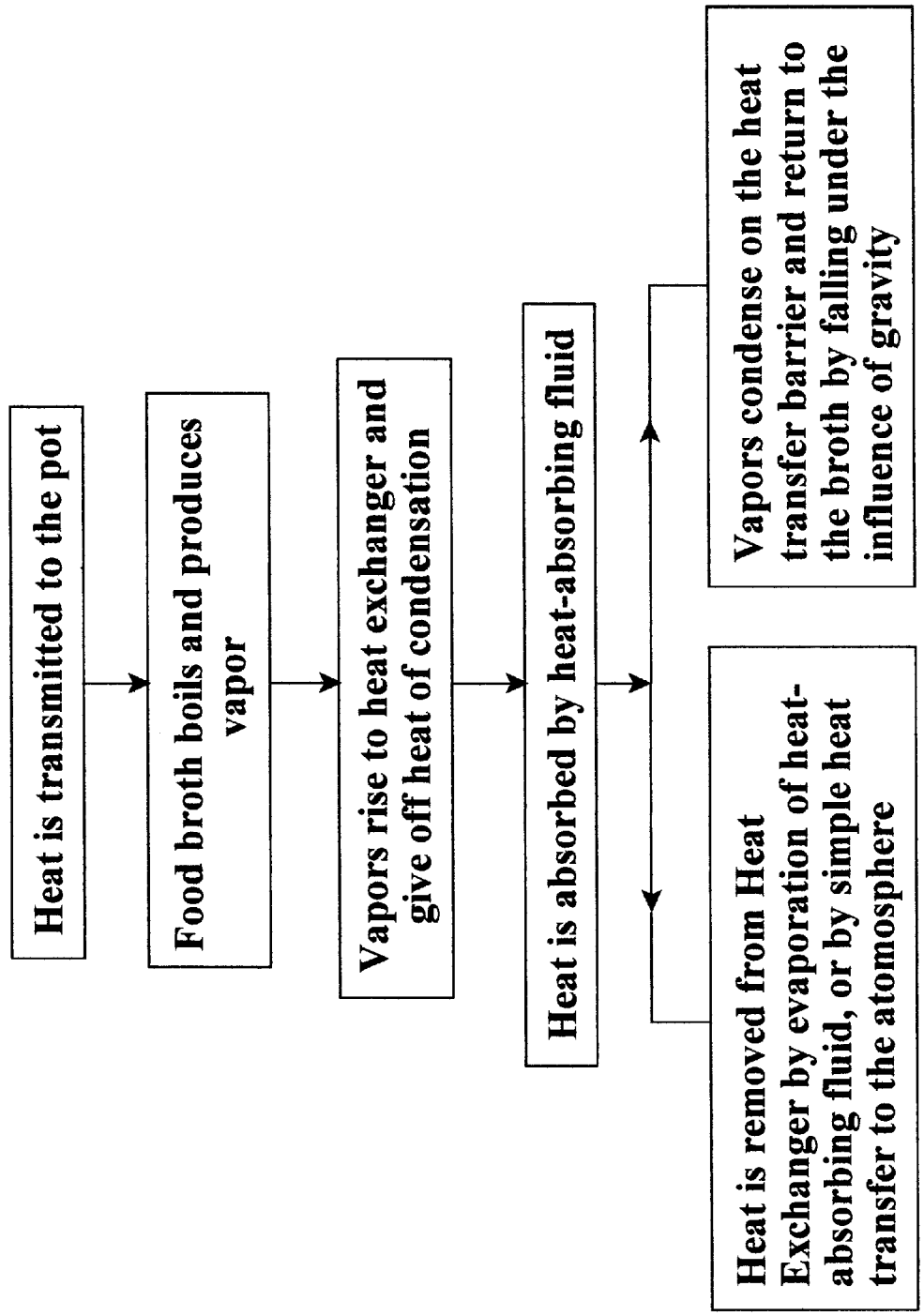
FIG. 12 is a flow chart illustrating the process of the present invention.

The flow chart of FIG. 12 illustrates process of the present invention, which has been described in detail hereinbefore.

I claim:

1. A cooking apparatus, comprising:

an open-topped cooking pot having a pot side wall having an upper edge and a pot bottom wall;

a lid shaped and dimensioned to fit closely over the upper edge of said pot side wall, said lid having a lid bottom wall for heat transfer, a lid side wall and a lid top wall, said lid bottom, side and top walls defining a hollow lid interior and said lid bottom wall closing said pot and defining a pot top wall;

and heat exchange means operatively associated with said lid for condensing the cooking vapors containing oils and food particulates rising from food being cooked in said pot into contact with said lid bottom wall and falling back into said pot and into said food being cooked in said pot;

wherein said heat transfer means is a thermoelectric cooler at the bottom of said lid;

and further comprising heat radiating fins on the top of said lid in heat conductive relationship to said thermoelectric cooler to receive heat therefrom.

2. A cooking apparatus for use with an open-topped cooking pot, comprising:

a lid shaped and dimensioned to fit closely over the top of said pot and having heat radiating fins on the top;

and a thermoelectric cooler on the bottom of said lid having its cool side down and exposed to cooking vapors rising from said pot, said thermoelectric cooler having its hot side up and in heat conducting relationship with said fins, said cooler having a power cord for applying an energizing voltage thereto; said thermoelectric cooler closing said pot and defining a pot top wall, such that cooking vapors containing oils and food particulates rising from food being cooked in said pot into contact with said thermoelectric cooler fall back into said pot and into said food being cooked in said pot.

* * * * *